US008052814B2

(12) United States Patent
Kellhammer et al.

(10) Patent No.: US 8,052,814 B2
(45) Date of Patent: Nov. 8, 2011

(54) POSITION-VARIABLE CONTROL CONSOLE

(75) Inventors: Thomas Kellhammer, Bach a.d. Donau (DE); Robert Giehrl, Wiesent (DE)

(73) Assignee: Krones AG, Neutraubling (DE)

( * ) Notice: Subject to any disclaimer, the term of this patent is extended or adjusted under 35 U.S.C. 154(b) by 431 days.

(21) Appl. No.: 11/664,323

(22) PCT Filed: Jul. 5, 2006

(86) PCT No.: PCT/EP2006/006526
§ 371 (c)(1), (2), (4) Date: Jul. 2, 2009

(87) PCT Pub. No.: WO2007/025592
PCT Pub. Date: Mar. 8, 2007

(65) Prior Publication Data

US 2009/0294070 A1 Dec. 3, 2009

(30) Foreign Application Priority Data

Aug. 31, 2005 (DE) ......................... 10 2005 041 531

(51) Int. Cl.
*B32B 41/00* (2006.01)

(52) U.S. Cl. .......... 156/64; 156/365; 156/367; 156/368; 700/83; 700/84; 700/85

(58) Field of Classification Search .................... 156/64, 156/365, 367, 368, 556; 700/83, 84, 85
See application file for complete search history.

(56) References Cited

U.S. PATENT DOCUMENTS

| | | | | |
|---|---|---|---|---|
| 6,488,794 | B1 * | 12/2002 | Bright et al. | 156/86 |
| 2004/0099379 | A1 * | 5/2004 | Erich | 156/567 |
| 2005/0153427 | A1 * | 7/2005 | Eder et al. | 435/287.1 |
| 2007/0163697 | A1 * | 7/2007 | Kursawe | 156/64 |

FOREIGN PATENT DOCUMENTS

| | | | |
|---|---|---|---|
| EP | 1 449 778 | A1 | 8/2004 |
| EP | 1 561 690 | A1 | 8/2005 |
| WO | WO-97/13645 | | 4/1997 |
| WO | WO-2005/068301 | A1 | 7/2005 |
| WO | WO-2005/068302 | A1 | 7/2005 |

OTHER PUBLICATIONS

Dell Latitude C400 System Information document, Sep. 2001, Dell Computer Corporation, all pages.*
IDS returned Mar. 31, 3011, from May 31, 2008.*
IDS returned Mar. 31, 3011, from Mar. 29, 2007.*
International Preliminary Report on Patentability based on International Application No. PCT/EP2006/006526; International Filing Dated: Jul. 5, 2006; Date of Issuance: Apr. 8, 2008.

* cited by examiner

*Primary Examiner* — George Koch
(74) *Attorney, Agent, or Firm* — Marshall, Gerstein & Borun LLP

(57) ABSTRACT

A device and a method, in particular for labeling containers, in particular bottles, having a corresponding conveyor device, several equipment units, in particular labeling units, and a controller as well as a control console for controlling certain unit functions. To ensure reliable operation of the device, the control console is arranged to be variable in position and at least one position detector is provided, whereby the controller enables or blocks certain functions in a safety-oriented manner as a function of the position of the control console.

21 Claims, 4 Drawing Sheets

POSITION-VARIABLE CONTROL CONSOLE

CROSS-REFERENCE TO RELATED APPLICATION

This is the U.S. national stage under 35 U.S.C. §371, of international application no. PCT/EP2006/006526, having an international filing date of Jul. 5, 2006, and claims priority to German application no. 10 2005 041 531.8 filed on Aug. 31, 2005.

FIELD OF THE DISCLOSURE

The disclosure relates to a device and a method for a position variable console, such as used with carousels in beverage bottling production operations.

BACKGROUND OF THE DISCLOSURE

A device and/or a method of this type is already known from WO 2005-068 302 A1, for example. A corresponding device and such a method are already known from WO 2005-068 301 A1 as well. With the known devices for furnishing bottles, in particular for labeling bottles, a carousel is provided for conveying the bottles. Labeling units are arranged interchangeably on the periphery of the machine. To do so, equipment unit receptacles supported at the bottom, for example, are provided.

For the various equipment units, however, various parameters must be input at the controller end in particular. Furthermore, the heights of the individual equipment units must be adjusted individually according to the desired labeling task, especially in the case when units are changed or when changing the labeling process (height of label adhesive on the bottle). A suitable control console is provided for this purpose. Input and/or adjustment of certain parameters or execution of certain functions, in particular adjustment of the height of the labeling units or "tilting," i.e., manual rotation of the machine and/or carousel, e.g., with opened protection, could not be performed easily from a console at a great distance and would result in considerable adjustment problems as well as safety problems because of the risk of injury when raising and lowering the equipment units.

SUMMARY OF THE DISCLOSURE

Against this background, the object of the present disclosure is to provide a device and a corresponding method that will permit improved and safer input and execution of certain machine functions and system functions.

According to the present disclosure, the control console is variable in position, in particular being arranged in the circumferential direction of the machine so that it is variable in position. For example, the control console may be moved toward the individual units. It is thus possible to ensure that the control console can be brought into the area of the unit on which adjustments are to be made so that the operator can observe the respective unit when making the adjustment. Due to the fact that a position detector is provided according to the present disclosure, it is possible to recognize whether the control console is in one of several predetermined positions. If the control console is in such a position, a corresponding signal may be sent to a controller, whereby the controller can then enable or block certain functions of the device or in particular certain units as a function of this position. It is thus possible to ensure that an operator can execute certain functions only when the control console is arranged in a certain area of the unit, e.g., in the field of vision of the operator, while this function cannot be performed by the other units that are not within the field of vision of the operator. It is thus possible to ensure that many functions are performed only in certain positions of the control console. A separate position detector may be provided for each area or a position detector that monitors all the predetermined areas may be provided. Multiple position detectors may of course be provided for each unit, e.g., to the left, centrally or to the right of the unit.

According to a preferred embodiment of the present disclosure, the device has multiple position detectors, each sending a signal to the controller when the control console is in one of several predetermined areas. In other words, the individual position detectors are assigned to certain areas and the detectors respond when the control console is in the corresponding area.

It is advantageous if a respective position detector is provided for each unit, and if the controller enables a certain function of the corresponding unit when the position detector recognizes that the control console is in an area assigned to that unit and it blocks these functions for the other units. This ensures that an operator can perform certain functions only if he is standing by the corresponding unit, i.e., within the field of vision whereas these functions cannot be performed with other units. This is of great importance in particular in adjusting the height of the units because for safety reasons the unit must be located within the field of vision of the operator to rule out the risk of an accident to anyone who happens to be standing in the vicinity when a unit is lowered to the floor or raised up from the floor.

According to one embodiment, the device has a protective cover which can be opened in at least two protective areas, whereby certain functions of the device are enabled by the controller when the position detector ascertains that the control console is in a position range that is in the opened protective range. It is thus possible to ensure that certain functions such as manual activation and/or rotation can be performed by tilting the drive of the machine only when the control console is in the corresponding protective area.

According to the present disclosure, only a single control console may be used for all units.

According to a preferred exemplary embodiment, the conveyor device is a carousel.

According to a preferred embodiment, the position detector is a position switch which is operated mechanically, for example, when the control console is moved past it and which relays the position of the control console to the controller on operation in the direction of a safety-oriented operation. Such a position switch, which may be mechanical or optical, for example, can be mounted easily and inexpensively in the area of the equipment units and can reliably ascertain when the control console is arriving at the position switch. On activation of the position switch, a signal is then sent in a safety-oriented manner to the controller, indicating that the control console is in the respective area to then enable the certain functions for this unit, as described above.

The control console is advantageously designed as a touch-screen where the operator can perform the input directly on the screen.

The enabling or blocking of functions of individual equipment units may be accomplished either via a hardware interlock or a software and/or hardware interlock. The enabling or blocking may be implemented by a corresponding hardware interlock, where the machine control does not allow certain functions of the equipment units or the device, for example, when the operator console is not in a certain position, i.e., the machine control activates or deactivates the actuators belonging to the functions, e.g., the corresponding safety bridge. In addition the software may be designed so that input of certain functions is possible only when the control console is in a certain position. The user surface may also be designed to be position-dependent accordingly.

According to a preferred embodiment, the control console has a pivoting arm which is mounted to rotate about a longitudinal axis essentially in the center of the device. The control console may thus be moved from one equipment unit to the next at least in an arc of a circle around the carousel. The cable tree to the rotatable pivoting arm is then advantageously designed to be capable of torsion, so that no rotating contact (grinding ring) is necessary.

Additionally or alternatively, a first ring strip or line may be arranged at least partially around a central axis of the device with the carriage carrying the control console mounted on this ring strip. The position switches may then be arranged in such a way that they are operated when the control console and/or parts of the control console holder or a corresponding operating element moves past them.

The length of the operating element is preferably smaller than the distance between two position switches for two neighboring areas. This ensures that a control console activates only one position switch for one area at a time and thus relays a corresponding signal to the controller. This ensures that two position switches can never be operated at the same time. Should this nevertheless occur, e.g., in the case of a mechanical or electrical defect, this will be detected by the machine controller and an error signal will be output and/or the machine will be stopped. The size of the area in which the position switch responds can be determined on the basis of the length of the activating arm.

The functions that can be input via the control console and are activated or deactivated as a function of the position of the control console may include for example the adjustment of equipment unit parameters, in particular the adjustment of the height of the equipment units as well as the manual operation, rotation of the device with the guard opened. This makes it possible to ensure safe operation of the device in any situation.

BRIEF DESCRIPTION OF THE DRAWINGS

The present disclosure is explained in greater detail below with reference to the following drawings.

DETAILED DESCRIPTION OF THE DISCLOSURE

Figure 1:
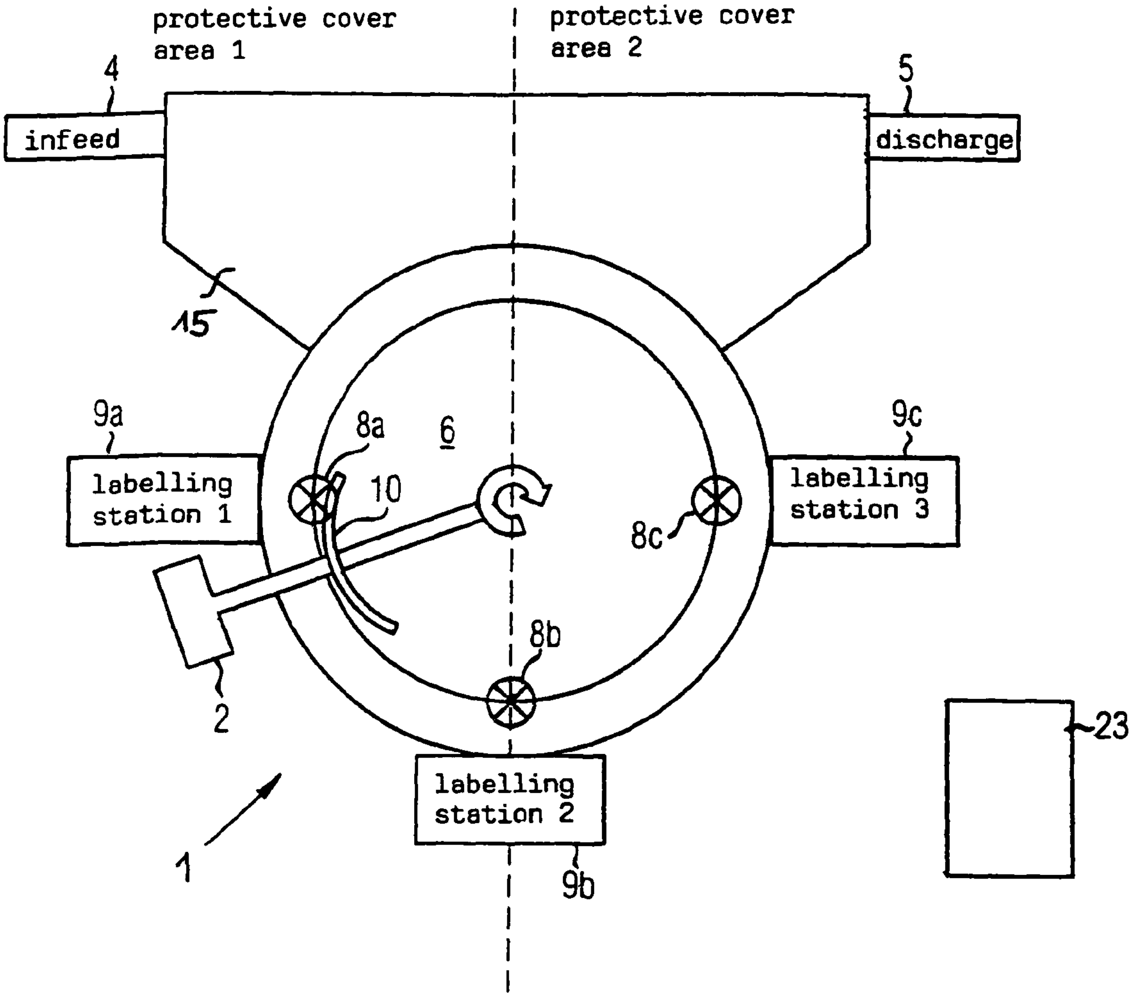
FIG. 1 shows schematically a top view of the disclosure device.
Figure 3:
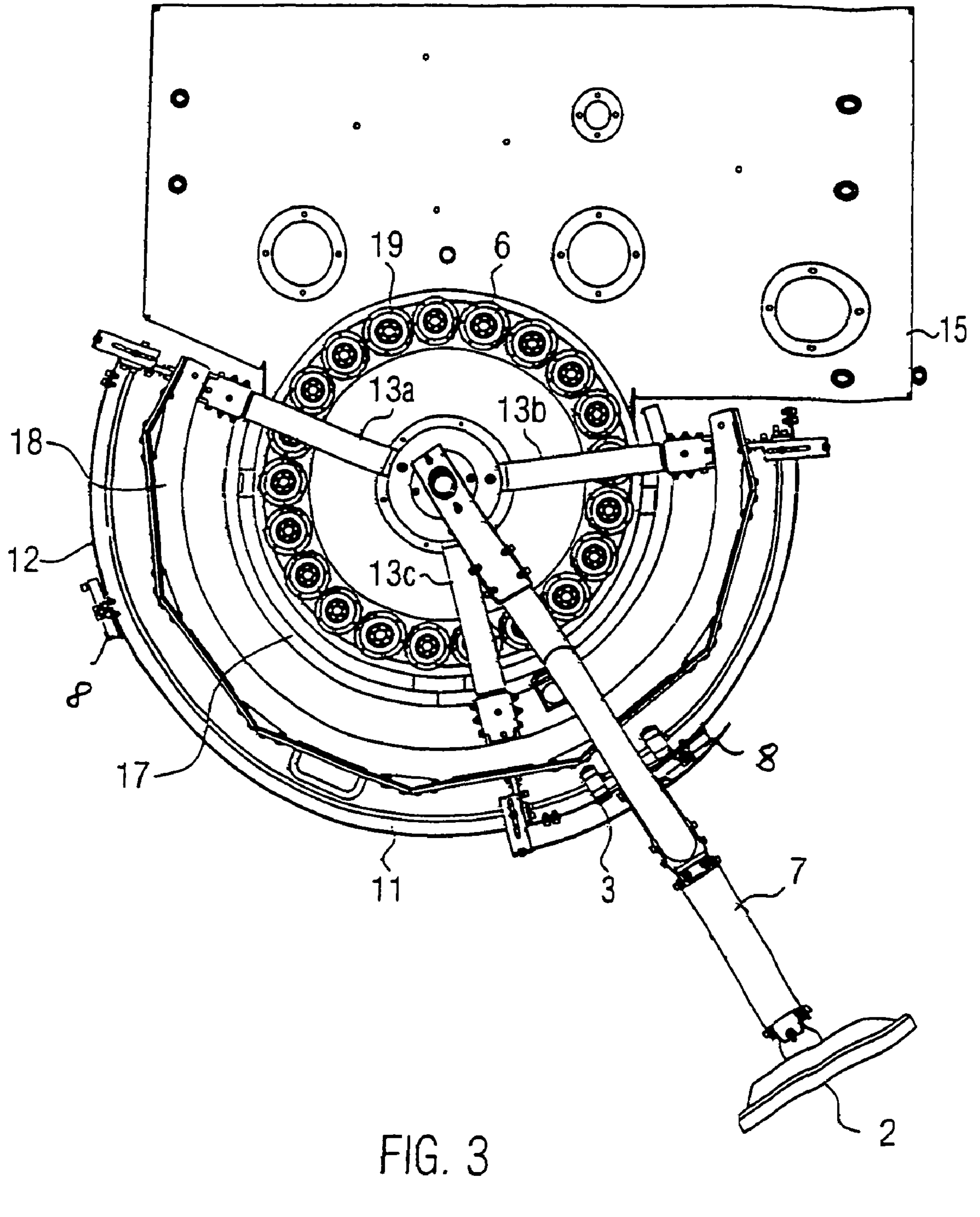
FIG. 3 shows a top view of an embodiment according to the present disclosure.

FIG. 1 shows schematically the essential design of the present disclosure. The device shown here is a modular labeling machine 1 which comprises multiple labeling units 9*a, b, c* which are replaceably docked on a carousel periphery so that they are offset around the circumference. The different labeling units are provided for the various labeling methods such as labeling with self-stick labels, rolls of labels or single-sheet labels, labeling with hot glue, cold glue, etc. It is thus possible to apply a wide variety of labels to different types of bottles or similar containers using one and the same piece of equipment. It is also possible in this way to apply different types of labels to one and the same bottle, e.g., a front side label and a back label. FIG. 1 shows the continuously drivable conveyor device 6 which conveys the containers, e.g., bottles here, past the labeling units (not shown in detail) to the labeling units 9*a, b, c*. Such a conveyor device 6 is a carousel here, for example, as illustrated in FIG. 3, conveying the bottles past the labeling units 9*a, b, c* in a path that is at least an arc of a circle.

The device also has an inlet 4 and an outlet 5, whereby the bottles can be transferred in a known manner from the inlet 4 to the carousel 6, e.g., by way of a star (not shown) and can be guided from the carousel to the outlet 5 by way of a corresponding outlet star. The carousel may also comprise small container tables and/or container plates, for example, each being rotatable with a servo control (electric servo motor), so that the bottles can be oriented in any desired manner.

Figure 2:
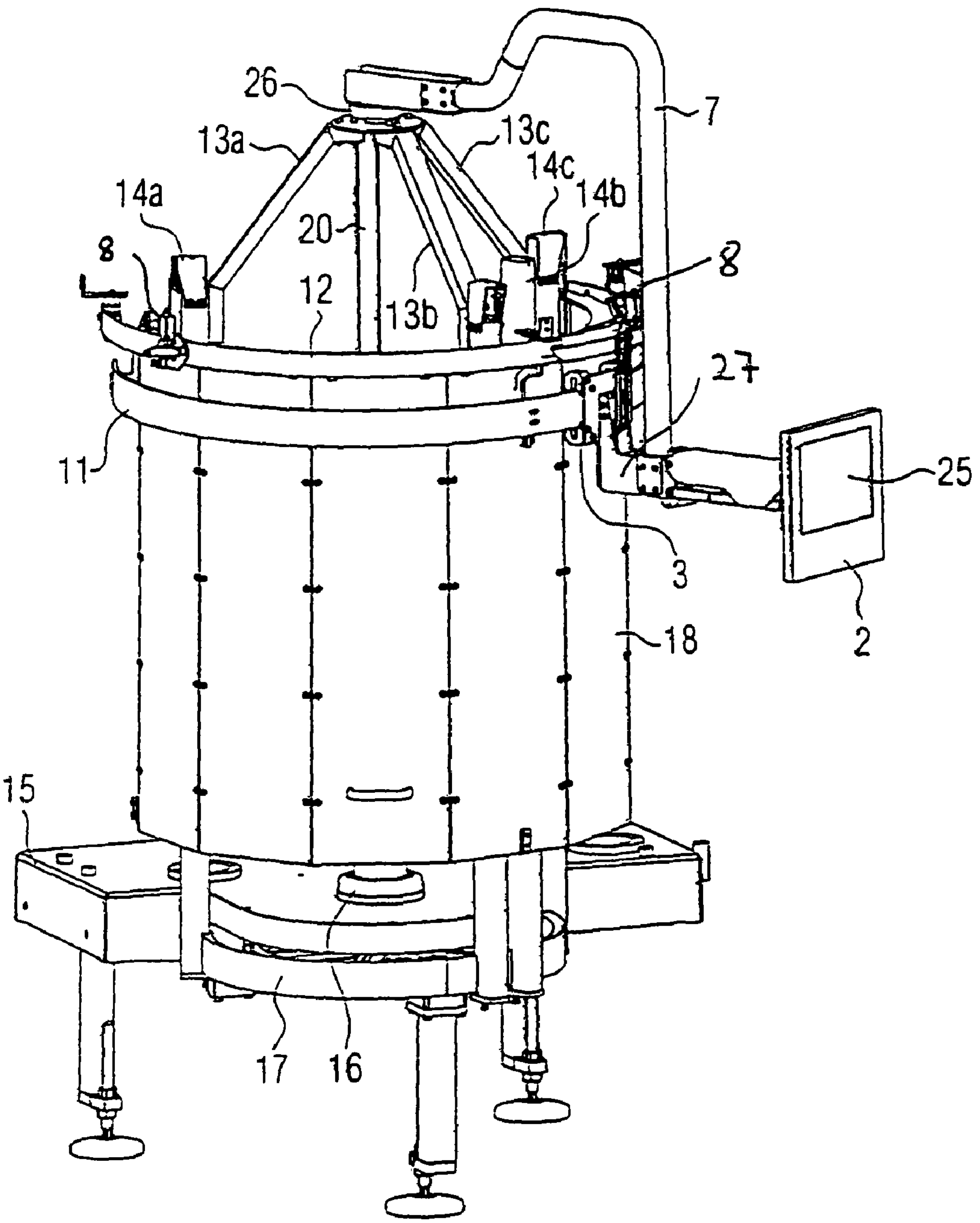
FIG. 2 shows a perspective view of an embodiment according to the present disclosure.

As shown better in FIG. 2, the device 1 has a frame 15 with a pivot bearing 16 for the carousel 6 arranged approximately centrally therein. At a radial distance from the pivot bearing 16, an at least partially circumferential ring 17 is attached in a stationary manner to the frame concentrically with the pivot bearing. As also explained in greater detail in WO 2005/068302, for example, a holder for equipment units may also be provided on the ring 17 to facilitate the replacement of different labeling units. For insertion and/or adjustment of the labeling units 9*a, b, c*, an integrated lift mechanism (not shown) may be provided. In addition, as FIG. 2 shows, the device has a protective cover 18, namely in the form of disks which can be opened in this case.

The device, i.e., the labeling machine 1 in the present case, also has an operator's console 2, e.g., in the form of a touchscreen 2 here; the control console, i.e., the touchscreen 2 here has a display 25 with input options for input and implementation of certain machine and equipment parameters and/or functions. In this embodiment, a single touchscreen 2 is provided for all labeling units; this is very advantageous for the operator and also saves on costs. The touchscreen 2 is arranged so that it is variable in position so that it can be moved between the individual labeling units 9*a, b, c*. In this embodiment the touchscreen is arranged so that it is rotatable about a central axis of the device 1, as indicated by the arrow in FIG. 1, by means of a pivot arm 7, as shown in FIGS. 1 through 3. The pivot bearing 26 for the pivot arm 7 is supported here by supporting arms 13*a, b, c* which are in turn connected by the connections 14*a, b, c* to the machine frame. The pivot bearing 26 for the pivot arm 7 and the bearing 16 for the carousel here are situated on the central axis of the device, although that need not necessarily be the case.

As shown best in FIG. 2, a cable tree 20 leads from the control unit and the power supply through the pivot arm 7 to the touchscreen 2. The cable tree 20 which is guided through the bearing 26 is advantageously capable of torsion so that no complex rotary contact is necessary. In addition, in this embodiment the touchscreen 2 is also carried by a carriage 3 via another arm 27 which runs on at least one ring strip and/or ring line 11, e.g., on rollers (not shown). The strip and/or line 11 extends at least in the form of a partial circle, such that the touchscreen 2 can be moved in relation to the individual labeling units 9*a, b, c*. The strip 11 here is situated outside of the protective cover 18.

As shown in FIG. 1 in particular, the device has several position detectors 8*a, b, c* which are illustrated here as position switches, as will be explained in greater detail below. The position switches 8*a, b, c* are each arranged here in the vicinity of corresponding labeling units 9*a, b, c* the position switches 8*a, b, c* are then activated by an activation element

10, namely here an activating arm, when the touchscreen 2 is in a corresponding position near the labeling unit (see FIG. 1). If the touchscreen 2 is near the labeling unit 9*a*, i.e., in an area in which the operator has the labeling unit 9*a* in his field of vision, then the position switch 8*a*, for example, is operated. If the touchscreen is in a position near the labeling unit 9*b*, then the position switch 8*b* is activated by an activation element 10 of the touchscreen 2. If the touchscreen 2 is near the labeling unit 9*c*, then the position switch 8*c* is activated here. When the individual position switches 8*a, b, c* are activated, they deliver a corresponding signal to a controller 23, e.g., the machine controller, in a safety-oriented manner. In this embodiment, a separate position switch 8*a, b, c* is provided for each predetermined area on the corresponding units, this position switch then responding when the touchscreen is in the corresponding position, i.e., in the predetermined area. However it is also conceivable for a single position detection device to be provided for all areas, e.g., an optical sensor, a motion sensor, etc. which can detect the position of the touchscreen. However, it is simple and inexpensive to use corresponding position switches.

The position detectors, i.e., switches 8*a, b, c* may also be arranged on a rail, i.e., strip 12 which extends at least in the form of at least a partial circle, as shown in FIGS. 2 and 3. The position switches are arranged in such a way that they are activated when the touchscreen 2 is moved past them. The activating element 10 that activates the position switch may be mounted on the arm 27 on the carriage 3 or on the pivot arm 7. It is not necessary to provide a separate activating element but instead the switch may also be activated by the carriage 3 and/or by the mount for the control console itself.

In any case, the position switch should be a so-called safety switch which relays the position of the touchscreen to the controller in a safety-oriented manner (e.g., AS-i safety bus). Through suitable design of the activating element 10, namely the activating arm here, this ensures that two position switches 8*a, b, c* can never be activated at the same time. This means that the length of the activating element 10 is in any case shorter than the distance between two position detectors 8*a, b* of two neighboring predetermined areas. The area and/or size of the area in which the touchscreen 2 is situated so that the position switch will respond may be ascertained based on the length of the activating element 10.

As mentioned previously, with the device shown in FIGS. 1 through 3 it is possible to ensure that two position switches can never be activated at the same time. If this is nevertheless the case (e.g., in the event of a mechanical or electric defect), this will be recognized by the machine controller and an error message will be output and/or the machine will be stopped.

Figure 4:
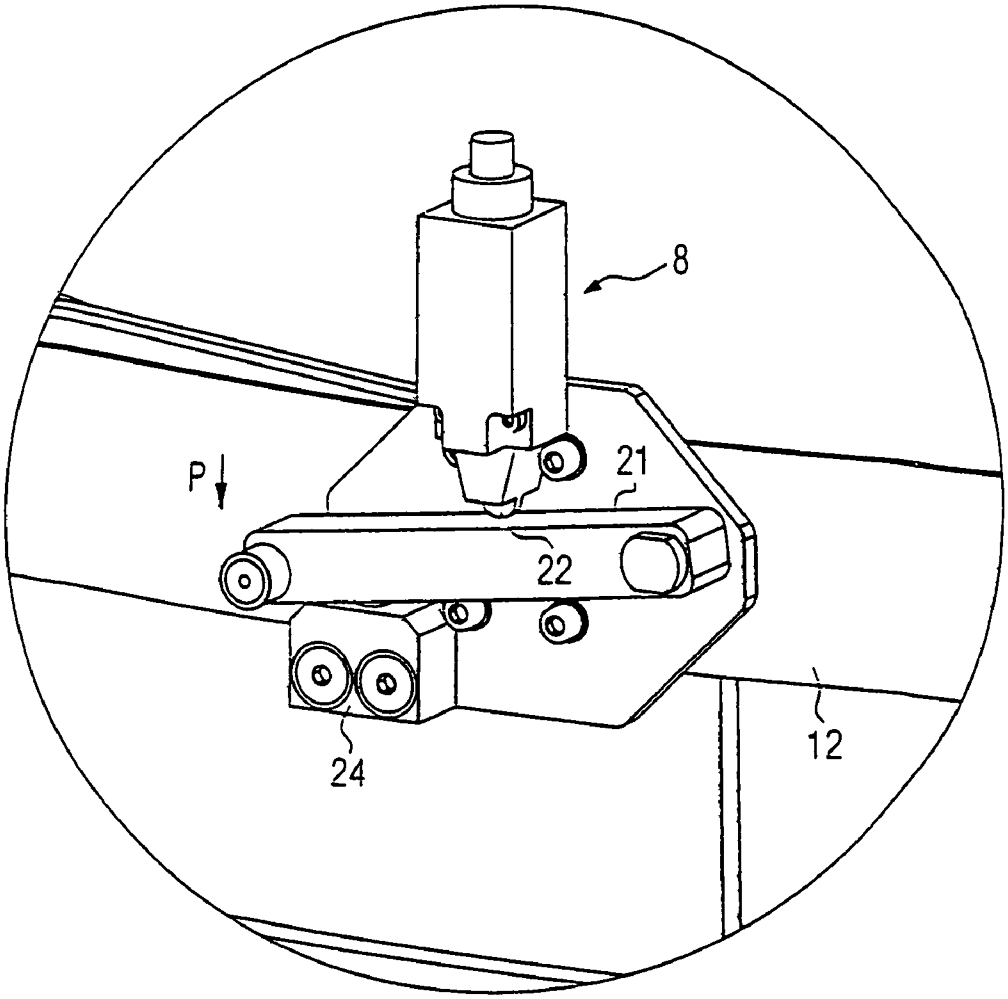
FIG. 4 shows a perspective view of a position detector which can be used for the present disclosure.

FIG. 4 shows an example of a mechanical position switch such as that which can be used for the present invention, for example. This position switch has a leg 21 that can pivot about the axis S. When the touchscreen 2 moves past the position switch, the leg 21 is guided downward by an activating element 10 of the touchscreen 2 and/or its holder, as indicated by the arrow P, so that the switch contact 22 of the position switch is enabled to then relay a corresponding signal to the controller. The switch may additionally have a proximity sensor 24.

The control 23 may enable or block certain functions of certain units 9*a, b, c* as a function of the position of the control console, i.e., the touchscreen 2. This makes it possible to ensure that many functions of a labeling unit can be executed only when the operator's console, i.e., the touchscreen 2, is situated near this labeling unit so that then this labeling unit is in the field of vision of the operator. The independent position detectors, i.e., switches 8*a, b, c* are then arranged in such a way that they respond when the control console 2 is in an area in which the respective labeling unit is within the field of vision of the operator who is in front of the control console 2.

For example, if the touchscreen 2 is in a position so that the labeling unit 9*a* is within the field of vision of the operator standing at the touchscreen 2, as illustrated in FIG. 1, then the position switch 8*a* is activated via the activating element 10 and certain functions are enabled only for the labeling unit 9*a* while these functions are not activated for the other labeling units 9*b, c* whose position switches 8*b, c* have not been activated.

The enabling and/or blocking of functions of the individual units 9*a, b, c* may be performed either by hardware interlocks or software and hardware interlocks. This means that in the case of FIG. 1, for example, the controller activates the actuators for the functions of the labeling unit 9*a* but not the actuators for the additional labeling units 9*b, c* so this ensures that exclusively the unit 1, i.e., the unit within the field of vision of the operator here can be active. In addition, the enabling or blocking may also be implemented by a software interlock due to the fact that certain inputs can be made in the operator's console 2 only when the operator's console 2 is in the predetermined position and/or in a predetermined area near the corresponding unit 9*a, b, c*. The user surface may then appear differently, depending on the position of the operator's console.

The functions that can be input via the operator's console 2 and are activated or deactivated according to the position of the operator's console 2 may include for example the adjustment of the height of the units, the input of different unit parameters as well as the manual operation ("tilting"), i.e., rotation of the machine (of the carousel).

The disclosed method is explained in greater detail below for the height adjustment of the labeling units and/or for manual rotation of the device with the guard opened.

As already explained, prior to operation of the installation, a height adjustment of the labeling units 9*a, b, c* may optionally be necessary. The height adjustment is performed by the operator using the operator's console, namely the touchscreen 2 here. All functions of the height adjustment of the units 9*a, b, c* are depicted on the touchscreen and can be operated there (e.g., raise/lower unit, store setpoint heights, etc.).

Only the height adjustment of the unit 9*a, b, c* directly within the field of vision of the operator may be active (for safety reasons—there is risk of injury in raising and/or lowering the units), so the position of the touchscreen 2 must be analyzed in a safety-oriented manner and this information relayed to the controller 23. Then depending on the position switch 8*a, b, c* activated, the respective actuators (e.g., raise/lower the guard) for the unit within whose range the touchscreen 2 is located are activated for that unit in the machine controller. The actuators for the other units are not activated. This ensures that only the unit within the field of vision of the operator can be activated. It is possible that the functions are enabled only when the corresponding position switch is activated. However, according to another embodiment, actuators for the corresponding functions may also remain activated after a single activation of the position switch 8*a*, 8*b*, 8*c* until another position switch is activated. In addition, the enabling or blocking may also be accomplished through appropriate software interlocks such that input and/or execution of the height adjustment on the display screen is possible only if the touchscreen 2 is in the position predetermined for the respective unit 9*a, b, c*, although there is no input option for the other labeling units. The user surface of the touchscreen can be adapted automatically accordingly as a function of the position switches 8*a, b, c*.

The disclosure will now be explained for the "rotation" of the machine, i.e., for the rotation of the carousel 6, via the touchscreen 2 with the guard 18 opened. The mechanical machine guard 18, i.e., the protective cover, is divided into two regions, i.e., the safety area 1 and the safety area 2 as depicted in FIG. 1. A button for tilting a machine, i.e., for rotating the carousel when the guard 18 is opened, can be found on the pivotable touchscreen 2. The tilting and/or rotation of the machine with the guard 18 opened, however, may be enabled only if the operator is within the field of vision of the open guard 18 (either safety area 1 or safety area 2). To do so, the position of the touchscreen 2 is input and analyzed in a safety-oriented manner. If the operator is in safety area 1, for example (left half of the top view of the machine in FIG. 1), then the tilt button on the touchscreen 2 may become active only when either the position switch 8*a* for the unit 9*a* or the position switch 8*b* for the unit 9*b* has been activated. The tilting must not be enabled if the position switch 8*c* for the labeling unit 9*c* has been activated. If the operator is in safety area 2 (right half of the top view of the machine), then the tilt button on the touchscreen 2 may be active only if either the position switch 8*b* for the unit 9*b* or the position switch 8*c* for the unit 9*c* has been activated. The tilting must not be enabled if the position switch for the unit 9*a* has been activated. To determine which safety area, i.e., which guard 18 has been opened, there is a corresponding sensor (not shown) on the protection and/or in the safety area, sending a safety-oriented signal to the controller 23.

Due to the secure detection of the position of the touchscreen, it is possible to automatically activate and/or deactivate certain functionalities and/or certain images in the touchscreen, i.e., as a function of the position of the touchscreen 2.

Automatic insertion and/or deletion of menu entries on the touchscreen for navigation in unit parameter images or fading in and/or fading out of unit trouble messages are also possible, and for example, an automatic status report of the respective unit may also be displayed.

What is claimed is:

1. Device with a conveyor device for containers, in particular bottles, comprising a plurality of equipment units, a controller, and a control console, the control console being arranged so as to be variable in position, at least one position detector provided for the control console, the controller one of enabling or blocking certain functions of the device as a function of the position of the control console, wherein the control console has a pivot arm that is mounted to rotate about a longitudinal axis of the device.

2. Device according to claim 1, and wherein several position detectors are provided, each position detector sending a signal to the controller when the control consoles are in one of several predetermined areas.

3. Device according to claim 1, wherein each equipment unit has a position detector associated therewith, the controller enabling certain functions of the corresponding equipment unit when the respective position detector detects that the control console is in an area assigned to that equipment unit and blocks these functions in the other equipment units.

4. Device according to claim 1, wherein the device has a protective cover which can be opened in at least two protective areas, and wherein certain functions of the device are enabled by the controller only when the position detector ascertains that the control console is in a position area that is in one of the opened protective areas.

5. Device according to claim 1, wherein the control console is a touchscreen.

6. Device according to claim 1, wherein the conveyor device is a carousel.

7. Device according to claim 1, wherein a control console is used for all the equipment units.

8. Device according to claim 1, wherein the position detector is a position switch which relays the position of the control console to the controller in a safety-oriented manner on activation.

9. Device according to claim 8, wherein the position switches are arranged so that they are activated when an activating element on the control console passes by them.

10. Device according to claim 9, wherein the length of the activation element is shorter than the distance between two position switches for two neighboring predetermined areas.

11. Device according to claim 1, wherein at least one of the enabling or blocking of functions is performed by one of a hardware interlock or by a hardware and software interlock.

12. Device according to claim 1, and a cable tree which leads to the rotatable pivot arm and which is capable of torsion.

13. Device according to claim 1, and a first ring strip or line is arranged around at least a portion of the circumference around the middle axis of the device, with a carriage carrying the control console running around the ring strip.

14. Device according to claim 1, wherein the equipment units are labeling units.

15. Method for labeling containers, comprising conveying the containers past several equipment units of a device, and one of enabling or blocking certain functions of the device as a function of the position of a position variable control console, and enabling or blocking certain functions of one of the equipment units when the control console is in an area near the given equipment unit.

16. Method according to claim 15, wherein the functions comprise the following:

adjusting unit parameters, adjusting the height of the equipment unit, and manual operation of the device with a protective cover opened.

17. Method according to claim 15, and displaying a user surface corresponding to the position of the control console on the control console.

18. Method according to claim 15, wherein the containers are bottles.

19. Method according to claim 15, wherein the equipment units are labeling units.

20. Method according to claim 15, and blocking the certain functions for the other equipment units when the control console is in the area near the given equipment unit.

21. Device with a conveyor device for containers, in particular bottles, comprising a plurality of equipment units, a controller, and a control console, the control console being arranged so as to be variable in position, at least one position detector provided for the control console, the controller one of enabling or blocking certain functions of the device as a function of the position of the control console, wherein the position detector is a position switch which relays the position of the control console to the controller in a safety-oriented manner on activation.

* * * * *